Dec. 6, 1927.
C. ZIMMERMAN ET AL
1,652,082
AUTOMOBILE HEADLIGHT DIMMER
Filed Feb. 18, 1927
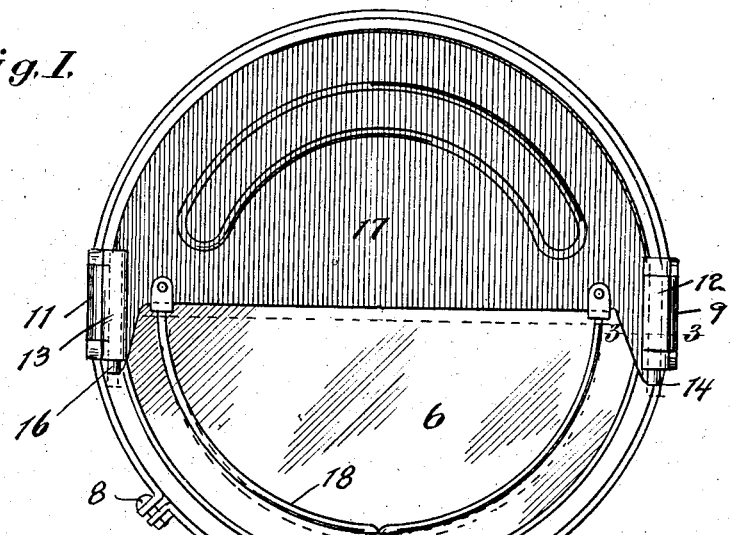
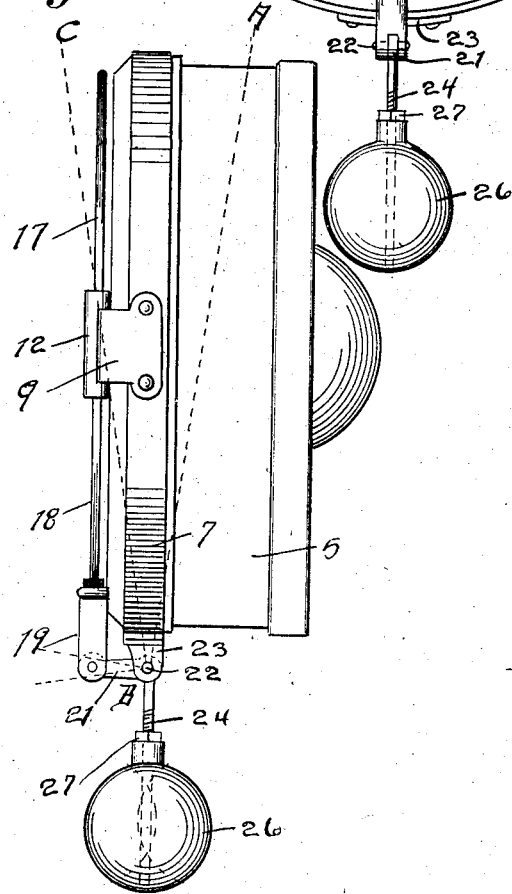
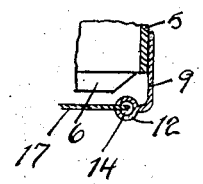
Inventors.
C. ZIMMERMAN
W. T. HAMNER
By Victor J. Evans
Attorney.

Patented Dec. 6, 1927.

1,652,082

UNITED STATES PATENT OFFICE.

CHARLES ZIMMERMAN AND WILLIAM T. HAMNER, OF LOS ANGELES, CALIFORNIA.

AUTOMOBILE HEADLIGHT DIMMER.

Application filed February 18, 1927. Serial No. 169,318.

This invention relates to improvements in dimming devices for headlights and has particular reference to means for removing the glare commonly found in automobile headlights.

The principal object of this invention is to provide means which will automatically decrease the amount of illumination issuing from the upper half of an automobile headlight when the car is proceeding up a grade, and will likewise increase the amount of illumination when the automobile is moving down-grade.

Another object is to produce a device which may be readily clamped to any standard automobile now upon the market.

A further object of this invention is to produce a device of this character which is economical to manufacture.

A still further object is to produce a device which is free from mechanical defects which might otherwise cause the device to be inoperative.

Other objects and advantages will be apparent during the course of the following description.

In the accompanying drawings forming a part of this specification, and in which like numerals are employed to designate like parts throughout the same, Figure 1 is a front elevation of an automobile headlight having my device applied thereto, Figure 2 is a side elevation of Figure 1, and Figure 3 is a fragmentary detail view taken on the line 3—3 of Figure 1.

It is common knowledge that when a vehicle has its front end elevated as in going up a grade, the angle of the lense often causes a glare which momentarily blinds the eyes of an oncoming driver.

We have therefore provided means whereby when the inclination of the vehicle changes, the illumination issuing from the lamps of the vehicle having my device applied thereto, will be automatically compensated so as to provide more or less illumination and at the same time to prevent a glare under certain conditions.

In the accompanying drawings wherein for the purpose of illustration is shown a preferred embodiment of our invention, the numeral 5 designates the customary headlight of a motor vehicle having lens 6 of any standard formation.

It is to the casing of the headlight 5, that we attach a band 7 as by a bolt 8. This band carries side brackets 9 and 11, which side brackets have secured thereto bearing pieces 12 and 13, respectively.

These bearing pieces 12 and 13 are adapted to position guides 14 and 16, carried upon a plate 17. This plate 17 is substantially semi-circular in shape as best shown in Figure 1.

Secured to the bottom of the plate 17 is a yoke 18 which is connected to a bifurcated member 19 to which one end of a bell crank lever 21 is pivotally attached. This bell crank lever has its pivotal connection at 22 to a bracket 23 carried upon the band 7. The lower end of the bell crank lever 21 is threaded as at 24, so as to engage a weight 26. A lock nut 22 serves to prevent the accidental displacement of the weight.

The result of this construction is that when a vehicle is equipped with my improved dimming device, and assuming that the automobile is travelling on a level road, the weights will be in the position shown in Figures 1 and 2. This will permit ample illumination to be projected along the highway.

When the vehicle encounters a grade causing the forward portion of the car to rise, the weight 26 will move rearwardly or toward the right of the drawing, with the result that the headlight will be in the position AB, which position would so elevate the rays of light as to blind an oncoming motorist.

After the headlight is in this position AB, the weight 26 will have moved so as to cause the plate 17 to assume the dotted line position of Figure 1.

When the vehicle proceeds down-grade so that the headlight assumes the position CB of Figure 2, the weight 26 will have moved forward or toward the left of the drawing with respect to its pivotal point (it of course being understood that the weight remains perpendicular at all times) and consequently, the plate 17 will have moved upwardly so as to permit greater illumination.

It will thus be seen that we have produced an automobile headlight dimmer which will accomplish all of the objects set forth, and one which may be quickly secured to the standard headlight now upon the market.

It is to be understood that the form of our invention herewith shown and described, is to be taken as a preferred example of the same and that various changes relative to the material, shape, size, and arrangement of parts may be resorted to without departing from the spirit of the invention, or the scope of the subjoined claims.

Having thus described our invention, we claim:—

1. In a headlight dimmer, the combination with a headlight of a band adapted to encircle said headlight, a pair of brackets secured to the opposite sides of said band, a substantially semi-circular plate slidably positioned in said brackets, a yoke secured to said plate, a bell crank lever pivoted to said band and having one arm connected to said yoke, a weight secured to the other arm of said bell crank lever, said weight being capable of moving said plate, for the purpose specified.

2. In a headlight dimmer the combination with a headlight of a band adapted to encircle said headlight, a pair of brackets vertically disposed on opposite sides of said headlight and secured to said band, slanted bearing pieces carried by said brackets, a semi-circular plate vertically positioned between said bearing pieces, guides secured to said semi-circular pieces and adapted to slide in said bearing pieces, a yoke secured to said plate and extending to a point below the lowermost margin of said headlight, a bell crank lever pivoted beneath said headlight and engaging said yoke and a weight secured to said bell crank lever in such a manner that when said weight is moving said plate will be actuated with respect to the vertical face of said headlight.

In testimony whereof we affix our signatures.

CHARLES ZIMMERMAN.
WILLIAM T. HAMNER.